United States Patent
Born et al.

(10) Patent No.: US 11,123,923 B2
(45) Date of Patent: Sep. 21, 2021

(54) 3D PRINTING DEVICE

(71) Applicant: Airbus Operations GmbH, Hamburg (DE)

(72) Inventors: Johannes Born, Hamburg (DE); Claus Fastert, Hamburg (DE); Jorne Driezen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/801,894

(22) Filed: Feb. 26, 2020

(65) Prior Publication Data

US 2020/0269503 A1 Aug. 27, 2020

(30) Foreign Application Priority Data

Feb. 27, 2019 (DE) ..................... 10 2019 202 660.5

(51) Int. Cl.
| | | |
|---|---|---|
| *B29C 64/209* | (2017.01) | |
| *B29C 64/245* | (2017.01) | |
| *B29C 64/227* | (2017.01) | |
| *B29C 64/25* | (2017.01) | |
| *B33Y 30/00* | (2015.01) | |

(52) U.S. Cl.
CPC .......... *B29C 64/209* (2017.08); *B29C 64/227* (2017.08); *B29C 64/245* (2017.08); *B29C 64/25* (2017.08); *B33Y 30/00* (2014.12)

(58) Field of Classification Search
CPC ....... B29C 64/20; B29C 64/209; B29C 64/25; B29C 64/364; B33Y 30/00
See application file for complete search history.

(56) References Cited

U.S. PATENT DOCUMENTS

| 5,746,844 A | * | 5/1998 | Sterett | .................... B29C 41/36 |
| | | | | 148/522 |
| 2004/0104515 A1 | | 6/2004 | Swanson et al. | |
| 2014/0367519 A1 | * | 12/2014 | Goehlich | .................. B64C 1/00 |
| | | | | 244/119 |
| 2015/0217514 A1 | | 8/2015 | Maier | |

(Continued)

FOREIGN PATENT DOCUMENTS

| CN | 106493356 A | * | 3/2017 |
| CN | 106 493 356 B | | 8/2018 |

OTHER PUBLICATIONS

European Search Report for Application No. 20158487.7 dated Jun. 29, 2020.

*Primary Examiner* — Joseph S Del Sole
*Assistant Examiner* — Jerzi H Moreno Hernandez
(74) *Attorney, Agent, or Firm* — Jenkins, Wilson, Taylor & Hunt, P.A.

(57) ABSTRACT

A 3D printing device includes a printing substrate, a movable printing head configured for additively producing from a modelling material a component on the printing substrate, and a flexible printing space cover which, proceeding from the printing head, spans the printing substrate such that a closed printing space is formed between the printing head and the printing substrate, wherein a printing nozzle of the printing head for applying the modelling material protrudes into the printing space. A support structure of the device includes flexible support rods which run from the printing head to the printing substrate and which hold the printing space cover above the printing substrate.

11 Claims, 5 Drawing Sheets

(56) References Cited

U.S. PATENT DOCUMENTS

| | | | |
|---|---|---|---|
| 2016/0068793 A1* | 3/2016 | Maggiore | B29C 64/227 |
| | | | 435/289.1 |
| 2016/0263822 A1* | 9/2016 | Boyd, IV | B33Y 10/00 |
| 2016/0361873 A1 | 12/2016 | Maier | |
| 2019/0184639 A1* | 6/2019 | Lopez | B29C 64/245 |
| 2020/0086573 A1* | 3/2020 | Cohen | B29C 64/364 |
| 2020/0094562 A1* | 3/2020 | Rhee | B29C 64/255 |

* cited by examiner

3D PRINTING DEVICE

CROSS-REFERENCE TO RELATED APPLICATION

This application claims priority to German Patent Application No. 10 2019 202 660.5 filed Feb. 27, 2019, the entire disclosure of which is incorporated by reference herein.

TECHNICAL FIELD

The disclosure herein relates to a 3D printing device.

BACKGROUND

In the case of generative, or additive, respectively, production methods, generally also referred to as "3D printing methods", one or a plurality of initial materials, proceeding from a digitalized geometric model of an object, are sequentially layered on top of one another in tiers and cured. For example, in the case of fused deposition modelling (FDM) or fused filament fabrication, a component is thus constructed layer-by-layer from a modelling material, for example a plastics material or a metal, in that the modelling material is provided in the form of a strip or wire, is liquefied by heating, and by extruding from a nozzle is applied to a printing substrate, on account of which a solid contiguous component results upon cooling. 3D printing offers an exceptional degree of freedom in terms of design, and inter alia permits objects which could not be produced, or be produced only with significant complexity, by way of conventional methods, to be produced with a manageable complexity. For this reason, 3D printing methods are widely used nowadays in the field of industrial design, in the automotive industry, the aerospace industry, or generally in the field of industrial product research and development (R&D), where a resource-efficient process chain is used for producing in small or large volumes individualized components tailored to requirements.

Current extrusion-based 3D printing devices ("3D printers") most often have Cartesian or delta-robot kinematic drive systems having an open printing environment or a closed printing chamber. In the case of 3D printers having a closed printing/construction chamber, materials having relatively high melting temperatures (>300° C.) as well as partially crystalline materials which require particular temperature conditions during the printing process can be used. In this case, the printing environment can moreover be tailored to specific requirements in terms of, for example, air humidity, pressure, composition, etc.

More recently, robot-supported 3D printing approaches in which industrial robots are used are being pursued in the field of scientific research and of technological R&D. In this case, operating usually takes place in an open printing environment which renders conditioning in terms of temperature, pressure, etc., extremely difficult. In principle, it would indeed be possible for the entire mechanical construction composed of the robot and the 3D printer to be enclosed. However, this would mean a significant complexity in terms of protecting the sensitive electronic system of the robot and of the 3D printer at elevated temperatures of 200° C. or 300° C. or more in order for the functionality of the kinematics to be guaranteed.

Publication US 2015/0217514 A1 describes a 3D printing device having a sterile production environment. A closed chamber having sterile lateral walls folded in the manner of an accordion is provided herein, the chamber being sufficiently large for receiving the object produced. Two printing nozzles for the material deposition penetrate a pair of valves on the upper side of the chamber so as to deter air and particles from entering the chamber. The printing nozzles herein are configured so as to be movable horizontally as well as in a vertical direction relative to the object, wherein the chamber when forming the object expands in the vertical direction. The chamber herein is braced by way of lateral wall belts so as to prevent the chamber contacting the object to be produced.

SUMMARY

Against this background, the disclosure herein is based on an object of finding more flexible solutions for 3D printing devices having a closed printing space, in particular for robot-supported applications.

This object is achieved according to the disclosure herein by a 3D printing device having features described herein.

Accordingly, a 3D printing device is provided. The 3D printing device comprises a printing substrate; a movable printing head which is configured for additively producing from a modelling material a component on the printing substrate; a flexible printing space cover which, proceeding from the printing head, spans the printing substrate in such a manner that a closed printing space is formed between the printing head and the printing substrate, wherein a printing nozzle of the printing head for applying the modelling material protrudes into the printing space; and a support structure which comprises flexible support rods which run from the printing head to the printing substrate and which hold the printing space cover above the printing substrate.

One of the underlying ideas of the disclosure herein lies in achieving a flexible printing volume between a movable printing head and a printing substrate, the flexible printing volume being variable in terms of size and shape but thereby also being nevertheless closed and "following" a movement of the printing head, so to speak. To this end, a flexible construction composed of a printing space cover which is held by a support construction extends from the printing head to the printing substrate. The printing space cover herein serves for defining the closed printing space, that is to say that the printing space cover covers the printing substrate in the manner of a hood. The support structure, on the other hand, supports the printing space cover in a manner similar to how tent poles hold a tent tarpaulin, and ensures that the printing space cover is held and stabilized above the printing substrate. It can thus be in particular prevented that the printing space cover comes into contact with the printing substrate and the printed product, or the extruded product, respectively, situated thereon. To this end, the support structure has support rods which by virtue of the flexibility thereof can follow the movement of the printing head to a certain extent. In a movement of the printing head, for example a translatory and/or a rotary movement, the printing space cover as well as the support structure are entrained on the printing head, on account of which the printing space is deformed. By virtue of the flexibility of the cover herein it is ensured at all times that the printing space remains closed. The printing space is thus capable of conditioning, that is to say, for example, that the printing space can be heated, be filled with a gas, be evacuated, that a moisture value within the printing space can be varied, etc. The printing volume can thus inter alia be encapsulated in relation to contamination. On the other hand, sensitive components of the 3D printing device, for example the electronic system of the printing head and/or a robot construction, can remain in a non-conditioned environment outside the printing space, such that the sensitive components do not have to be protected in relation to the conditions within the printing space, for example in relation to an elevated temperature. Only those regions of the printing head that are directly required for depositing modelling material, that is to say in particular one or a plurality of printing nozzles, can protrude into the printing space. The printing nozzle/printing nozzles can furthermore be configured for not only applying modelling material but moreover supporting material which can serve for supporting the deposited modelling material, or the printed component, respectively.

3D printing methods are particularly advantageous since the 3D printing methods enable the production of three-dimensional components in primary forming methods without needing special manufacturing tools that are adapted to the external shape of the components. On account thereof, highly efficient production processes for parts and components that save material and time are enabled. 3D printing methods of this type are particularly advantageous in the aerospace sector, since very many different components that are adapted to special applications are used herein, the components by such 3D printing methods being producible at low cost, with a short production lead time, and with little complexity in the manufacturing systems required for the production.

3D printing methods in the context of the disclosure herein comprise all generative, or additive, respectively, production methods in which, based on geometric models, objects of a predefined shape by chemical and/or physical processes are produced in a special generative manufacturing system from shapeless materials such as liquids and powders, or shape-neutral semi-finished products such as, for instance, strip-shaped or wire-shaped material. 3D printing methods in the context of the present application herein use additive processes in which the initial material is sequentially constructed layer-by-layer in predefined shapes. 3D printing methods in the context of the disclosure herein include inter alia fused deposition modelling (FDM), selective laser sintering (SLS), selective laser melting (SLM), and similar methods. The disclosure herein is particularly relevant to additive production methods having high printing rates and (fiber-) reinforced composite materials.

Advantageous design embodiments and refinements are derived from the description with reference to the figures.

According to a refinement, the printing space cover can comprise an at least single-ply film. The printing space cover can thus be designed in a particularly simple manner so as to be weight-saving and cost-saving. When using a film, the printing space cover and thus the entire system can be scaled in a particularly simple manner for arbitrary sizes. A limitation is created only on account of the maximum possible film size. However, individual films can be adhesively bonded and/or welded so as to form larger portions. For example, the film can be made from a plastics material, for example polyimide or silicone. However, the film can likewise be configured having two or more plies, for example as a composite film. Alternatively or additionally to the plastics material, further materials such as metal can be provided. The film material can be selected with the view to the conditions provided in the printing space. For example, a particularly heat-resistant and/or tear-resistant material can be used.

According to a refinement, the printing space cover can comprise a two-ply film. The two-ply film can have an intermediate space which is capable of being filled. A two-ply film of this type can serve, for example, as an insulating layer, wherein the intermediate space can be filled and/or inflated with an insulation medium.

According to a refinement, the printing space cover can be fastened to the printing head and/or the printing substrate by repeatedly releasable closure tape. All solutions which are known to the person skilled in the art and suitable for the specific application can be used herein as a closure tape, for example hook-and-loop tapes, magnetic tapes, zip fasteners, etc. The printing space cover is thus releasable from the printing head and/or the printing substrate in a rapid and simple manner.

According to a refinement, the printing space cover can be capable of being opened by way of a repeatedly releasable closure tape. The closure tape herein can run from the printing head along the printing space cover to the printing substrate. Access to the printing space can thus be rapidly established in that an opening is achieved by way of the closure tape.

According to a refinement, the printing head can have a fastening ring in which the support rods are mounted. For example, encircling bores into which the support rods are capable of being simply plug-fitted can be provided in the fastening ring. Corresponding bores can moreover also be provided in the printing substrate. Alternatively, the support rods can also be otherwise fastened, or mounted, respectively, on the printing head and/or the printing substrate.

According to a refinement, the printing space cover can be fastened to the fastening ring. For example, the printing space cover can be adhesively bonded to the fastening ring by way of an adhesive tape. Alternatively or additionally, repeatedly releasable closure tapes can be utilized for fastening. In principle, it is likewise provided in further design embodiments for the printing space cover to be otherwise fastened to the printing head, for example without providing a special fastening ring.

According to a refinement, the printing space cover can have a controllable gas conduit by way of which an internal pressure of the printing space is capable of being set in relation to an ambient pressure of the 3D printing device. For example, one or a plurality of valves can be provided on the printing space cover so as to direct air and/or another gas into the printing space cover and out of the latter again. In this way, a (slight) positive pressure in relation to the environment of the 3D printing device can be generated within the printing space, for example. The volume, the shape, and the stability of the printing space cover can thus be regulated.

According to a refinement, the printing head can be configured so as to be movable along at least one translation axis and/or at least one rotation axis. For example, the printing head can be movable along the three usual translation axes, that is to say in three mutually perpendicular spatial directions. Alternatively or additionally however, the printing head can also be configured so as to be rotatable about one or a plurality of rotation directions so as to achieve an ideally high flexibility when depositing the modelling material.

According to a refinement, the printing head can be configured as an end effector of an industrial robot. The industrial robot herein can be disposed so as to be predominantly outside the printing space; in particular, the industrial robot can be placed outside the printing space and protrude into the printing space by way of only a portion of the printing head, for example by way of a printing nozzle of the printing head. Sensitive components of the industrial robot can thus remain outside the conditioning-capable printing space and do not have to be protected in relation to the conditions prevailing in the latter, for example in relation to high temperatures.

According to a refinement, the printing substrate can form a surface of an aircraft structure. For example, printing in this manner can take place directly on a surface of an aerofoil, of a fuselage, or of any other structure of an aircraft, in particular a passenger aircraft, this rendering this approach particularly efficient. By virtue of the disclosure herein it is in particular not necessary for the entire component to be enclosed, but for only that region of the surface to be closed off by way of the printing space cover where production is to take place in an additive manner. Consequently, the remaining region of the surface, or of the vehicle, is not subjected to the particular conditions of the printing space such as, for example, an elevated temperature. Of course, the printing substrate can likewise form a surface of an arbitrary other component, for example of a land craft or a watercraft.

The above design embodiments and refinements can be combined with one another in an arbitrary manner, in as far as this is expedient. Further potential design embodiments, refinements, and implementations of the disclosure herein also comprise combinations, which are not explicitly mentioned, of features of the disclosure herein described above or below with regard to the exemplary embodiments. In particular, a person skilled in the art will also add individual aspects as improvements or additions to the respective basic form of the disclosure herein.

BRIEF DESCRIPTION OF THE DRAWINGS

The disclosure herein will be explained in more detail hereunder by the example embodiments set forth in the schematic figures, in which.

DETAILED DESCRIPTION

The appended figures are intended to impart a more in-depth understanding of the embodiments of the disclosure herein. The figures visualize embodiments and in conjunction with the description serve for explaining principles and concepts of the disclosure herein. Other embodiments and many of the advantages mentioned are derived from the drawings. The elements of the drawings are not necessarily shown true to scale in relation to one another.

In as far as not otherwise stated, identical, functionally identical, and functionally equivalent elements, features, and components are in each case provided with the same reference signs in the figures of the drawing.

Figures 1, 2, 3, 4:
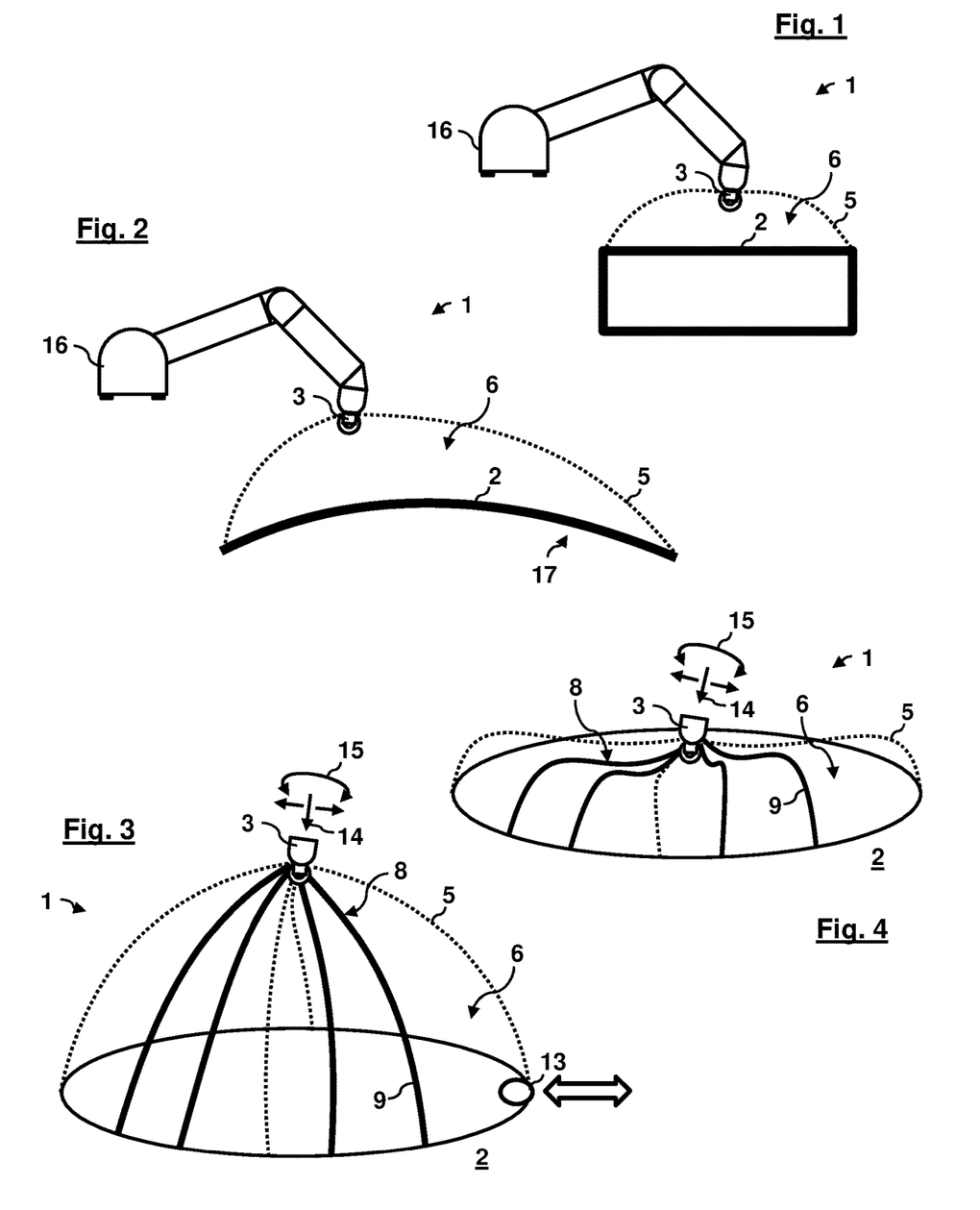
FIG. 1 shows a schematic perspective sectional view of a 3D printing device according to one embodiment of the disclosure herein.
FIG. 2 shows a schematic perspective sectional view of a 3D printing device according to one further embodiment of the disclosure herein.
FIGS. 3 and 4 show schematic perspective detailed views of the 3D printing device from FIG. 1.
Figure 5:
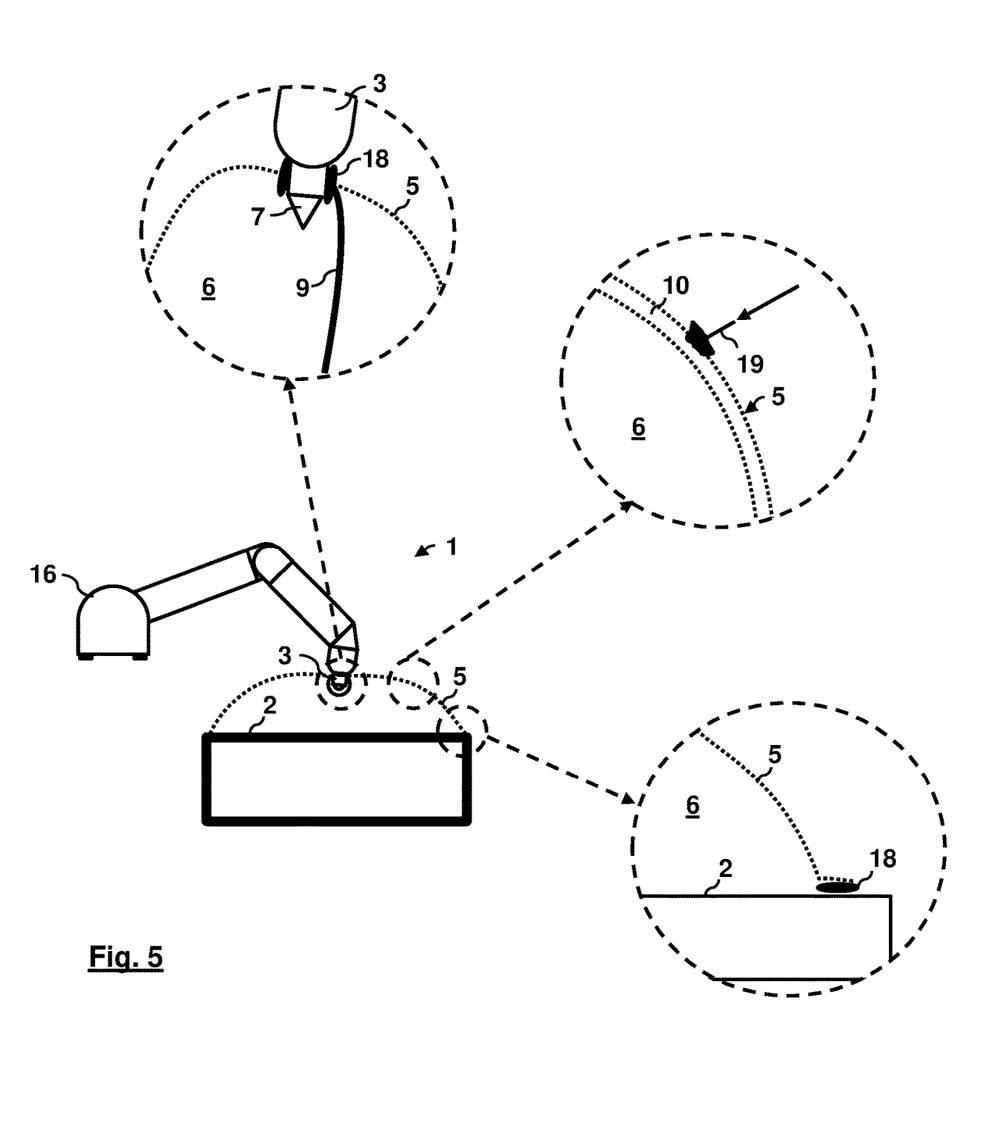
FIG. 5 shows a schematic perspective sectional view having enlarged individual details of the 3D printing device from FIG. 1.

FIG. 1 shows a schematic perspective sectional view of a 3D printing device 1 according to one embodiment of the disclosure herein. Various detailed views of the 3D printing device 1 are depicted in FIGS. 3 through 5.

The 3D printing device 1 comprises a printing substrate 2 on which a component is made from modelling material. For example, the modelling material can comprise one or a plurality of plastics materials, metal materials, ceramic materials, and/or composite materials, for example fiber-reinforced plastics material. The printing substrate 2 can be, for example, a printing platform such as is usually used in additive manufacturing, for example a table, plate, or the like. Alternatively however, the printing substrate 2 can likewise represent the surface of a component, or of a structure, respectively. To this end, FIG. 2 in an exemplary manner shows an embodiment in which the printing substrate 2 is a surface of an aircraft structure 17, for example a surface of an aircraft fuselage and/or of an aircraft wing. In this case, the component is produced directly on the surface of the aircraft structure 17.

The 3D printing device 1 furthermore comprises a movable printing head 3 which is configured for producing from the modelling material the component 4 in an additive manner on the printing substrate 2. The printing head 3 can be configured, for example, as an FDM printing head having two or three motion axes, for example having a 5-axis kinematic system with three translatory and two rotary degrees of freedom, or axes. Printing head 3 can thus be configured for receiving the modelling material in the form of a strip and/or a wire from a material supply. The modelling material is heated, on account thereof rendered free flowing, and is subsequently applied by way of one or a plurality of printing nozzles 7 of the printing head 3 (cf. FIG. 5, top). A translation axis 14 and a rotation axis 15 are identified in the exemplary manner in FIGS. 3 and 4. Moreover, a supporting material can be applied by way of the printing nozzles 7.

The printing head 3 in the embodiments shown is in particular configured as an end effector of an industrial robot 16, that is to say that the printing head 3 by controlling by the industrial robot 16 can be moved to various positions and orientations above the printing substrate 2, or the printed product, or the extruded product, respectively, situated on the latter, respectively.

The 3D printing device 1 furthermore comprises a flexible printing space cover 5 which, proceeding from the printing head 3, spans the printing substrate 2 in such a manner that a closed printing space 6 is formed between the printing head 3 and the printing substrate 2. The printing nozzle 7 of the printing head 3 herein for applying the modelling material protrudes into the printing space 6 (cf. FIG. 5). The printing space cover 5 thus forms a type of closed hood or dome above the printing substrate 2. The printing space cover 5 can be, for example, a single-ply or a multi-ply film from heat-resistant plastics materials such as, for example, polyimide (for example Kapton), silicone, or the like. The printing space cover 5 can furthermore have at least one intermediate space 10 between a plurality of film plies, as is schematically indicated in exemplary manner at the top right in FIG. 5. The intermediate space 10 can be coupled to a gas conduit, for example a valve 19. The intermediate space 10 can in this manner be filled, or inflated, respectively, with an insulating gas, for example.

In the example design embodiment according to FIGS. 1 and 3 through 5 the printing space cover 5 is fastened to the printing head 3 as well as to the printing substrate 2 by way of adhesive tapes 18 (cf. FIG. 5 top and right). In principle, techniques such as are known, for example, in vacuum constructions in the production of fiber-composite components can be used herein.

By virtue of the flexible design embodiment of the printing space cover 5 as a film, the printing space cover 5 in a movement of the printing head 3 is entrained, so to speak, on account of which the shape of the printing space 6 is varied. To this end, FIGS. 3 and 4 show two examples, wherein the printing head 3 in FIG. 4 is situated close to the printing substrate 2 and in FIG. 3 has a maximum vertical distance from the printing substrate 2, that is to say that the printing space 6 has the maximum potential volume thereof. The printing space cover 5 in FIG. 4 thus is imparted an inwardly dented, or folded, design.

In order to prevent the printing space cover 5 contacting the printing substrate 2 and/or the extruded product, or the already printed component, respectively, the 3D printing device 1 within the printing space cover 5 furthermore comprises a support structure 8 from flexible support rods 9. Specifically, the support rods herein run from the printing head 3 to the printing substrate 2 and support, or hold, respectively, the printing space cover 5 above the printing substrate 2. In principle, this construction herein is reminiscent of a tent in which a tent tarpaulin bears on a skeleton of rods. In the case of the present support rods 9, comparable materials, or design embodiments, respectively, can also be used, for example semi-rigid tent rods from metal and/or plastics material, fiber-reinforced plastics material rods, simple plastics material poles, etc. For example, the support rods 9 can be plug-fitted into the printing head 3 and the printing substrate 2, for example by way of bores specially provided to this end, or be otherwise fastened in a releasable or non-releasable manner to the printing head 3 and the printing substrate 2. Furthermore, the support rods 9 can be fixedly or elastically connected to the printing space cover 5, for example by way of tabs, adhesive connections, tapes, etc.

By virtue of the flexible design embodiment of the support rods 9, the support structure 8, conjointly with the printing space cover 5, thus to some extent follows a movement of the printing head 3. However, the rods 9 can be configured so as to be stiff in such a manner that any contact with the printing substrate 2, or the printed component, respectively, is prevented independently of the position of the printing head 3.

The printing space cover 5 furthermore has a controllable gas conduit 13 by way of which an internal pressure of the printing space 6 is capable of being set in relation to an ambient pressure of the 3D printing device 1 (cf. FIG. 3). The gas conduit 13 can have, for example, one or a plurality of valves, or be configured as a valve, respectively. On account thereof, the printing space 6, conjointly with the printing space cover 5 situated thereabove, and including the support structure 8 can be inflated, so to speak, so as to additionally stabilize the printing space cover 5. The internal pressure of the printing space 6 in FIGS. 3 and 4 can thus also be regulated in combination with a corresponding movement of the printing head 3. In one particularly simple embodiment, hot air can be pumped into the printing space 6 by way of the gas conduit 13, and/or air can be discharged by way of the latter, for example. Alternatively or additionally, the air, or a gas, respectively, in the printing space 6 can be heated by way of heating devices.

As a result, a closed printing space 6 is achieved between the printing head 3 and the printing substrate 2, the closed printing space 6 now being able to be conditioned in a manner corresponding to the respective application, for example in terms of temperature, pressure, humidity, air/gas composition, etc. The printing space 6 by virtue of being coupled to the printing head 3 adapts at all times to the movement of the latter. Only the printing nozzle 7 of the printing head 3 herein protrudes into the printing space 6. This also means that only this portion of the printing head 3 has to be configured so as to be robust, or resistant, respectively, in relation to the prevailing conditions in the printing space 6, for example in relation to an elevated temperature. By contrast, sensitive electronic or other components of the industrial robot 16, or of the printing head 3, can remain outside the printing space 6. A particularly flexible and simple solution for a robot-supported 3D printing device having a closed printing space 6 is thus provided. In the case of the embodiment in FIG. 2, only a specific sub-portion of an aircraft surface can moreover be masked in a targeted manner. The remaining part of the aircraft is thus not directly influenced by the additive process.

Figure 6:
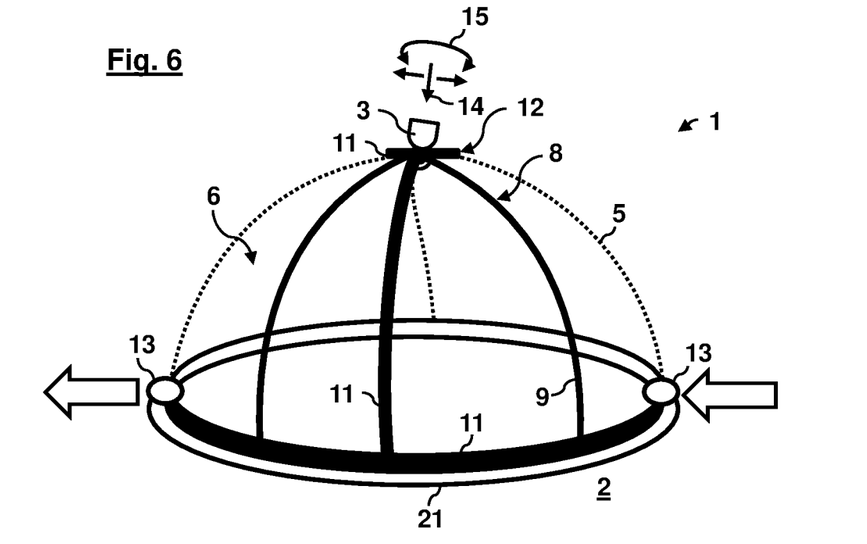
FIGS. 6 and 7 show schematic perspective detailed views of a 3D printing device according to one further embodiment of the disclosure herein.
Figure 7:
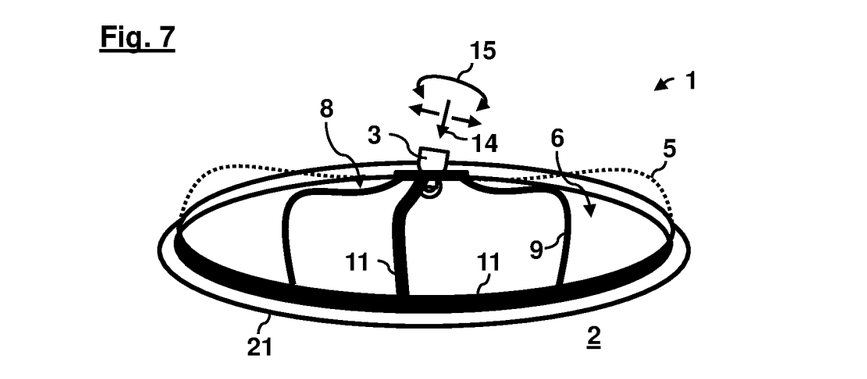
Figure 8:
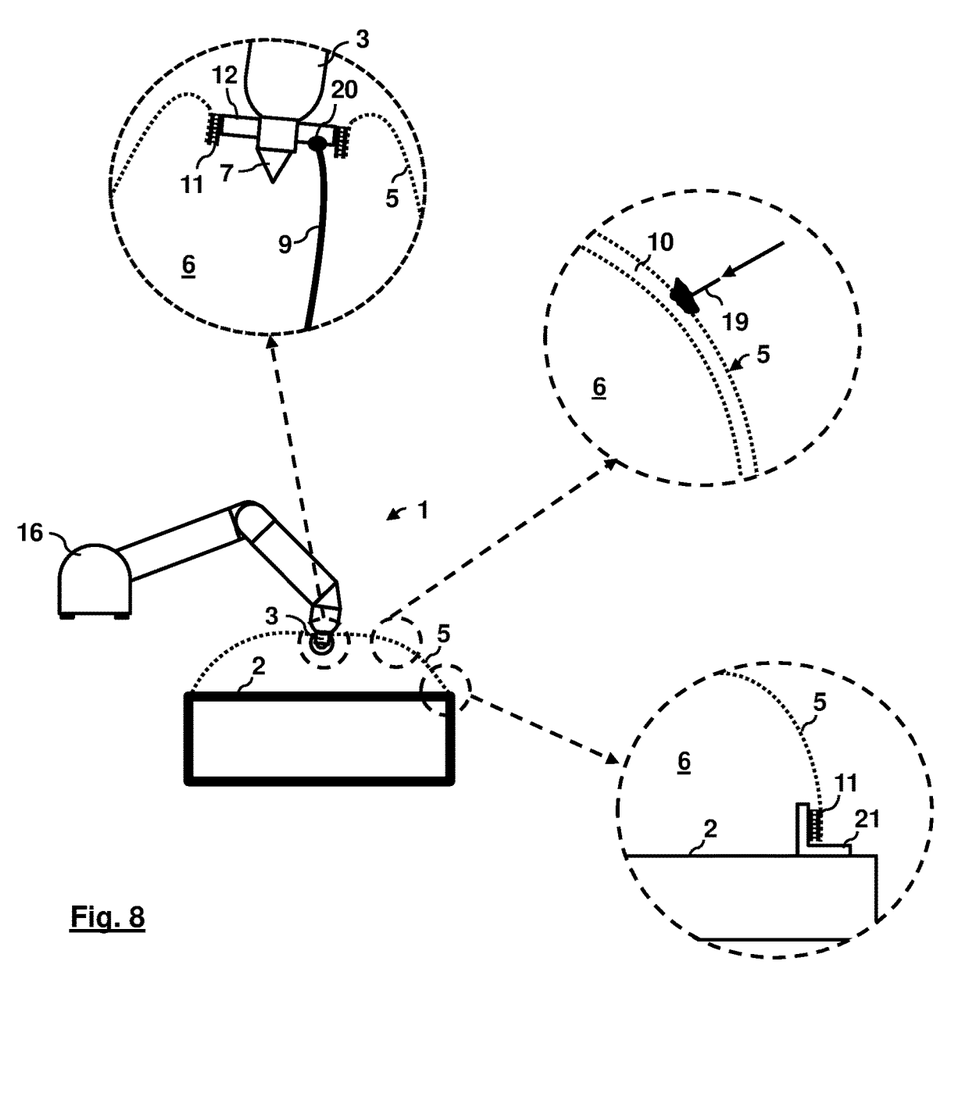
FIG. 8 shows a schematic perspective sectional view having enlarged individual details of the 3D printing device from FIGS. 6 and 7.

FIGS. 6 through 8 show various views of a 3D printing device 1 according to a further embodiment of the disclosure herein. In principle, the 3D printing device 1 has a construction that is similar to the 3D printing devices 1 from FIGS. 1 through 5.

In a manner different from the latter, the printing space cover 5 here is however fastened to the printing substrate 2 as well as to the printing head 3 by way of repeatedly releasable closure tapes 11 such that the printing space cover 5 is at all times capable of being rapidly (dis-)assembled, or opened/closed, respectively. To this end, an encircling connection piece 21 to which one of the closure tapes 11 is fastened (cf. FIG. 8, right bottom) is provided on the printing substrate 2. The printing head 3 furthermore has a fastening ring 12 (cf. FIG. 8, top) to which in turn a further one of the closure tapes 11 is fastened. The fastening ring 12 furthermore has bores 20 for the mounting of the support rods 9 (cf. FIG. 8, top). Corresponding bearings can of course likewise be provided in the printing substrate 2 (not depicted). A third closure tape 11 on the printing space cover 5 runs from the printing head 3 to the printing substrate 2 and can be utilized for at all times opening the printing space cover 5 in a rapid and simple manner without having to release the latter from the printing head 3 or the printing substrate 2 to this end. The closure tapes 11 can be, for example, hook-and-loop tapes, magnetic tapes, zip fasteners, or the like.

Two gas conduits 13 are furthermore incorporated in the printing space cover 5, for example one inlet valve and one outlet valve. A flow of heated air, for example for regulating the pressure of the printing space 6, optionally in conjunction with a controller of the movement of the printing head 3, can be implemented by way of the two gas conduits 13, for example, the heated air being able to be admitted at one of the two gas conduits 13 and discharged again at the respective other gas conduit 13.

Figure 9:
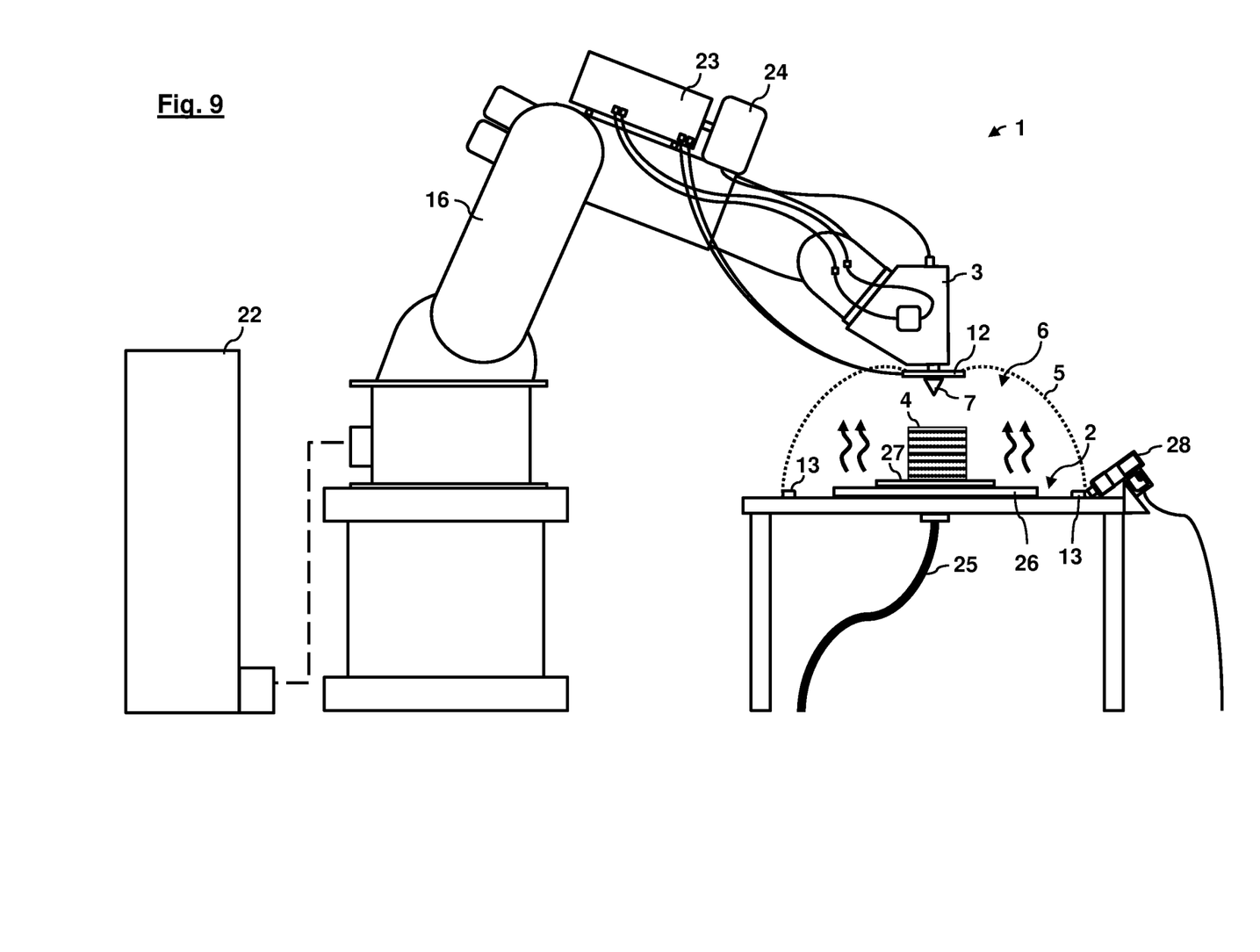
FIG. 9 shows a schematic perspective sectional view of a 3D printing device according to one further embodiment of the disclosure herein.

FIG. 9 shows a schematic perspective sectional view of a 3D printing device 1 according to one further embodiment of the disclosure herein. Like the embodiments in FIGS. 1 through 8, this 3D printing device 1 also has an industrial robot 16, the end effector thereof being configured as the printing head 3. The industrial robot 16 is controlled by way of a robot control installation 22, wherein the printing head 3 is taken care of by a special printing head control installation 23. A strip-shaped or wire-shaped modelling material is directed from a modelling material supply 24 to the printing head 3, is heated, and finally applied by way of a printing nozzle 7 of the printing head 3 so as to erect a component 4 layer-by-layer on a printing substrate 2. Like the embodiments of FIGS. 1 through 8, this 3D printing device 1 also has a flexible printing space cover 5 and a support structure 8 having flexible support rods 9 (the latter are not illustrated for reasons of clarity). The printing space cover 5 is fastened to the printing substrate 2 as well as to the printing head 3 and in this manner spans a printing space 6, wherein only the printing nozzle 7 of the printing head 3 protrudes into the printing space 6 while the other components of the industrial robot 16 are situated outside the printing space 6. The specific fastening of the printing space cover 5 herein can be performed by way of closure tapes 11 (not depicted), in a manner similar to that in FIGS. 6 through 8. The printing head 3 to this end again has a fastening ring 12.

The 3D printing device 1 on the printing substrate 2 furthermore comprises a heating installation 26, for example a hot plate as is known from the field of additive manufacturing, on which in turn the printing plate 27, for example a glass plate, which serves as the actual printing platform is situated. The printing plate 27 and the heating installation 26 by way of an evacuation installation 25 are drawn to the printing substrate 2 and fixed thereon. The heating installation 26 herein can be configured in the usual manner so as to heat the printed component 4 in an ideally uniform manner such that no deformation arises in the cooling and curing of the component.

The 3D printing device 1 furthermore has two gas conduits 13, wherein one hot air source 27 (for example a hot air gun) in an exemplary manner is plotted on one of the gas conduits 13. The printing space cover 5 and thus the volume of the printing space 6 can be regulated by blowing hot air thereinto at the gas conduit 13. The other gas conduit 13 can function as a discharge valve by way of which air (or gas, respectively) can optionally be discharged.

The robot control installation 22 and the printing head control installation 23 regulate the movement of the industrial robot 16, or of the printing head 3, respectively, wherein the printing head 3 for the layer-by-layer production of the component 4 is moved across the printing substrate 2. In a manner similar to that in the preceding embodiments, the printing head 3 to this end can be moved along a plurality of translation axes and rotation axes. A conditioning of the printing space 6, for example in terms of temperature, pressure, etc., can at the same time be regulated by the control installations 22, 23. To this end, corresponding sensors can furthermore be provided in the 3D printing device 1, for example temperature sensors, pressure sensors, etc., which communicate with the control installations 22, 23. Access to the printing space 6 can optionally be established at all times, for example in the case of a malfunction of the 3D printing device 1, by opening the closure tapes 11.

The closed printing space 6 between the printing head 3 and the printing substrate 2 can be conditioned so as to correspond to the respective application, for example in terms of temperature, pressure, humidity, air/gas composition, etc. The printing space 6 in a manner corresponding to the preceding embodiments likewise adapts to the movement of the printing head 3. Sensitive electronic or other components of the industrial robot 16, or of the printing head 3, respectively, are disposed outside the printing space 6 and do not have to be protected in relation to the conditions within the printing space 6. At the same time, the support structure 8 in conjunction with the regulated internal pressure ensures that the printing space cover 5 does not contact the already printed component 4.

In the preceding detailed description, various features have been combined in one or more examples in order to improve the cogency of the illustration. However, it should be clear that the above description is merely illustrative but in no way restrictive in nature. The description serves to cover all the alternatives, modifications and equivalents of the various features and exemplary embodiments. Many other examples will be immediately and directly clear to a person skilled in the art based on their expert knowledge in view of the above description.

The exemplary embodiments have been chosen and described to enable the principles underlying the disclosure herein and their possible uses in practice to be illustrated as well as possible. This will enable those skilled in the art to modify and use the disclosure herein and its various exemplary embodiments in an optimum way in respect of the intended purpose. In the claims and the description, the terms "containing" and "having" are used as linguistically neutral concepts for the corresponding term "comprising". Furthermore, use of the terms "a" and "an" is not intended, in principle, to exclude a plurality of features and components described in this way.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 1 3D printing device
2 Printing substrate
3 Printing head
4 Component
5 Printing space cover
6 Printing space
7 Printing nozzle
8 Support structure
9 Support rods
10 Intermediate space
11 Closure tape
12 Fastening ring
13 Gas conduit
14 Translation axis
15 Rotation axis
16 Industrial robot
17 Aircraft structure
18 Adhesive tape
19 Valve
20 Bore
21 Connection piece
22 Robot control installation
23 Printing head control installation
24 Modelling material supply 25 Evacuation installation
26 Heating installation
27 Printing plate
28 Hot air source

The invention claimed is:

1. A 3D printing device comprising:
a printing substrate;
a movable printing head which is configured for additively producing from a modelling material a component on a surface of the printing substrate;
a flexible printing space cover which, proceeding from the printing head, spans the printing substrate such that a closed printing space is formed between the printing head and the printing substrate, wherein a printing nozzle of the printing head for applying the modelling material protrudes into the printing space; and
a support structure which comprises flexible support rods which run from the printing head to the surface of the printing substrate and which hold the printing space cover above the printing substrate.

2. The 3D printing device according to claim 1, wherein the printing space cover comprises a film having at least one ply.

3. The 3D printing device according to claim 2, wherein the printing space cover comprises a two-ply film which has an intermediate space capable of being filled.

4. The 3D printing device according to claim 1, wherein the printing space cover is fastened to the printing head and/or the printing substrate by a repeatedly releasable closure tape.

5. The 3D printing device according to claim 1, wherein the printing space cover can be opened by way of a repeatedly releasable closure tape, wherein the closure tape runs from the printing head along the printing space cover to the printing substrate.

6. The 3D printing device according to claim 1, wherein the printing head has a fastening ring in which the support rods are mounted.

7. The 3D printing device according to claim 6, wherein the printing space cover is fastened to the fastening ring.

8. The 3D printing device according to claim 1, wherein the printing space cover has a controllable gas conduit by way of which an internal pressure of the printing space is capable of being set in relation to an ambient pressure of the 3D printing device.

9. The 3D printing device according to claim 1, wherein the printing head is configured to be movable along at least one translation axis and/or along at least one rotation axis.

10. The 3D printing device according to claim 1, wherein the printing head is configured as an end effector of an industrial robot.

11. The 3D printing device according to claim 1, wherein the surface of the printing substrate is a surface of an aircraft structure.

* * * * *